US011843319B2

(12) United States Patent
Hung (10) Patent No.: US 11,843,319 B2
(45) Date of Patent: Dec. 12, 2023

(54) LLC RESONANT CONVERTING APPARATUS

(71) Applicant: ASIAN POWER DEVICES INC., Taoyuan (TW)

(72) Inventor: Tsung-Liang Hung, Taoyuan (TW)

(73) Assignee: ASIAN POWER DEVICES INC., Taoyuan (TW)

( * ) Notice: Subject to any disclaimer, the term of this patent is extended or adjusted under 35 U.S.C. 154(b) by 173 days.

(21) Appl. No.: 17/497,916

(22) Filed: Oct. 9, 2021

(65) Prior Publication Data

US 2023/0053791 A1    Feb. 23, 2023

(30) Foreign Application Priority Data

Aug. 19, 2021 (TW) .................. 110130663

(51) Int. Cl.
*H02M 3/335* (2006.01)
*H02M 1/00* (2006.01)

(52) U.S. Cl.
CPC ..... *H02M 3/33576* (2013.01); *H02M 1/0058* (2021.05)

(58) Field of Classification Search
CPC ........... H02M 3/33576; H02M 1/0058; H02M 3/33571; H02M 3/33573; H02M 3/01; H02M 1/0022; Y02B 70/10
See application file for complete search history.

(56) References Cited

U.S. PATENT DOCUMENTS

2012/0026755 A1 * 2/2012 Wu ................... H02M 3/3378
363/17
2021/0067045 A1    3/2021 Zhang et al.

FOREIGN PATENT DOCUMENTS

| CN | 106411139 | * | 2/2017 | ............ H02M 3/335 |
| CN | 106411139 | A | 2/2017 | |
| CN | 107968471 | A | 4/2018 | |
| CN | 109617431 | * | 4/2019 | .............. H02M 1/42 |
| CN | 109617431 | A | 4/2019 | |
| TW | 200919925 | A | 5/2009 | |
| TW | 201414147 | A | 4/2014 | |

OTHER PUBLICATIONS

Attached translated foreign patent CN 109617431. (Year: 2019).*
Attached translated foreign patent CN 106411139. (Year: 2017).*
Office Action dated Nov. 25, 2022 of the corresponding Taiwan patent application No. 110130663.

* cited by examiner

*Primary Examiner* — Shawki S Ismail
*Assistant Examiner* — Htet Z Kyaw
(74) *Attorney, Agent, or Firm* — Chun-Ming Shih; HDLS IPR SERVICES (57) ABSTRACT

An LLC resonant converting apparatus determines to operate as a half-bridge LLC resonant converter or a full-bridge LLC resonant converter based on the magnitude of the input voltage. The present disclosure can solve the problem that the input voltage range of the LLC resonant converter is not wide enough.

9 Claims, 10 Drawing Sheets

LLC RESONANT CONVERTING APPARATUS

BACKGROUND

Technical Field

The present disclosure relates to an LLC resonant converting apparatus, and especially relates to an improved LLC resonant converting apparatus.

Description of Related Art

An LLC resonant converter is a common electronic circuit, which is one of the most attractive products; for example, it can be applied to the topology of a charger. However, the disadvantage of the current LLC resonant converter is that the input voltage range of the LLC resonant converter is not wide enough, so that the holding time is not long enough, and a large-volume output-end capacitor and a higher cost are required.

SUMMARY

In order to solve the above-mentioned problems, an object of the present disclosure is to provide an LLC resonant converting apparatus.

In order to achieve the object of the present disclosure mentioned above, an LLC resonant converting apparatus of the present disclosure includes a processor and an LLC resonant converter electrically connected to the processor, wherein the LLC resonant converter is configured to receive an input voltage. When the input voltage is greater than a predetermined voltage, the processor is configured to control the LLC resonant converter to operate in a half-bridge operating mode, so that the LLC resonant converter is configured to operate as a half-bridge LLC resonant converter; when the input voltage is less than or equal to the predetermined voltage, the processor is configured to control the LLC resonant converter to operate in a full-bridge operating mode, so that the LLC resonant converter is configured to operate as a full-bridge LLC resonant converter.

Moreover, in an embodiment of the LLC resonant converting apparatus of the present disclosure mentioned above, the LLC resonant converting apparatus further includes a voltage detector electrically connected to the processor and the LLC resonant converter, wherein the voltage detector is configured to detect the input voltage to inform the processor of the input voltage, so that the processor is configured to learn a magnitude of the input voltage to determine whether the LLC resonant converter is configured to operate in the half-bridge operating mode or the full-bridge operating mode.

Moreover, in an embodiment of the LLC resonant converting apparatus of the present disclosure mentioned above, the LLC resonant converter includes a first metal oxide semiconductor field effect transistor electrically connected to the processor and the voltage detector, a second metal oxide semiconductor field effect transistor electrically connected to the processor and the first metal oxide semiconductor field effect transistor, a third metal oxide semiconductor field effect transistor electrically connected to the processor, the first metal oxide semiconductor field effect transistor and the voltage detector, and a fourth metal oxide semiconductor field effect transistor electrically connected to the processor and the third metal oxide semiconductor field effect transistor.

Moreover, in an embodiment of the LLC resonant converting apparatus of the present disclosure mentioned above, when the LLC resonant converter is configured to operate in the half-bridge operating mode, the LLC resonant converter is configured to alternately operate in a half-bridge first state and a half-bridge second state; when the LLC resonant converter is configured to operate in the half-bridge first state, the processor is configured to turn on the first metal oxide semiconductor field effect transistor and the fourth metal oxide semiconductor field effect transistor, and turn off the second metal oxide semiconductor field effect transistor and the third metal oxide semiconductor field effect transistor; when the LLC resonant converter is configured to operate in the half-bridge second state, the processor is configured to turn off the first metal oxide semiconductor field effect transistor, the third metal oxide semiconductor field effect transistor and the fourth metal oxide semiconductor field effect transistor, and turn on the second metal oxide semiconductor field effect transistor.

Moreover, in an embodiment of the LLC resonant converting apparatus of the present disclosure mentioned above, when the LLC resonant converter is configured to operate in the full-bridge operating mode, the LLC resonant converter is configured to alternately operate in a full-bridge first state and a full-bridge second state; when the LLC resonant converter is configured to operate in the full-bridge first state, the processor is configured to turn on the first metal oxide semiconductor field effect transistor and the fourth metal oxide semiconductor field effect transistor, and turn off the second metal oxide semiconductor field effect transistor and the third metal oxide semiconductor field effect transistor; when the LLC resonant converter is configured to operate in the full-bridge second state, the processor is configured to turn off the first metal oxide semiconductor field effect transistor and the fourth metal oxide semiconductor field effect transistor, and turn on the second metal oxide semiconductor field effect transistor and the third metal oxide semiconductor field effect transistor.

Moreover, in an embodiment of the LLC resonant converting apparatus of the present disclosure mentioned above, the LLC resonant converter further includes a resonant capacitor electrically connected to the first metal oxide semiconductor field effect transistor and the second metal oxide semiconductor field effect transistor, a resonant inductor electrically connected to the resonant capacitor, and a magnetizing inductor electrically connected to the resonant inductor, the third metal oxide semiconductor field effect transistor and the fourth metal oxide semiconductor field effect transistor.

Moreover, in an embodiment of the LLC resonant converting apparatus of the present disclosure mentioned above, the LLC resonant converter further includes a transformer electrically connected to the resonant inductor, the third metal oxide semiconductor field effect transistor, the fourth metal oxide semiconductor field effect transistor and the magnetizing inductor, a first diode electrically connected to the transformer, a second diode electrically connected to the transformer and the first diode, a third diode electrically connected to the transformer and the first diode, a fourth diode electrically connected to the transformer and the third diode, and an output-end capacitor electrically connected to the first diode and the third diode.

Moreover, in an embodiment of the LLC resonant converting apparatus of the present disclosure mentioned above, the LLC resonant converter further includes a primary-side first point electrically connected to the voltage detector, the first metal oxide semiconductor field effect transistor and the third metal oxide semiconductor field effect transistor, a primary-side second point electrically connected to the second metal oxide semiconductor field effect transistor and the fourth metal oxide semiconductor field effect transistor, a secondary-side first point electrically connected to the first diode, the third diode and the output-end capacitor, and a secondary-side second point electrically connected to the second diode, the fourth diode and the output-end capacitor, wherein the transformer includes a primary-side winding electrically connected to the resonant inductor, the third metal oxide semiconductor field effect transistor, the fourth metal oxide semiconductor field effect transistor and the magnetizing inductor, and a secondary-side winding electrically connected to the first diode, the third diode and the fourth diode.

Moreover, in an embodiment of the LLC resonant converting apparatus of the present disclosure mentioned above, when the LLC resonant converter is configured to operate in the half-bridge first state, a primary-side current flows through the primary-side first point, the first metal oxide semiconductor field effect transistor, the resonant capacitor, the resonant inductor, the primary-side winding, the fourth metal oxide semiconductor field effect transistor and the primary-side second point, and a secondary-side current flows through the secondary-side second point, the fourth diode, the secondary-side winding, the first diode and the secondary-side first point; when the LLC resonant converter is configured to operate in the half-bridge second state, the primary-side current flows between the resonant inductor, the resonant capacitor, the second metal oxide semiconductor field effect transistor, a parasitic diode of the fourth metal oxide semiconductor field effect transistor and the primary-side winding, and the secondary-side current flows through the secondary-side second point, the second diode, the secondary-side winding, the third diode and the secondary-side first point.

Moreover, in an embodiment of the LLC resonant converting apparatus of the present disclosure mentioned above, when the LLC resonant converter is configured to operate in the full-bridge first state, the primary-side current flows through the primary-side first point, the first metal oxide semiconductor field effect transistor, the resonant capacitor, the resonant inductor, the primary-side winding, the fourth metal oxide semiconductor field effect transistor and the primary-side second point, and the secondary-side current flows through the secondary-side second point, the fourth diode, the secondary-side winding, the first diode and the secondary-side first point; when the LLC resonant converter is configured to operate in the full-bridge second state, the primary-side current flows through the primary-side first point, the third metal oxide semiconductor field effect transistor, the primary-side winding, the resonant inductor, the resonant capacitor, the second metal oxide semiconductor field effect transistor and the primary-side second point, and the secondary-side current flows through the secondary-side second point, the second diode, the secondary-side winding, the third diode and the secondary-side first point.

The advantage of the present disclosure is to enable the LLC resonant converter to have a wide input voltage range, so that the holding time can be extended to greatly reduce the volume and the cost of the output-end capacitor.

Please refer to the detailed descriptions and figures of the present disclosure mentioned below for further understanding the technology, method and effect of the present disclosure achieving the predetermined purposes. It believes that the purposes, characteristic and features of the present disclosure can be understood deeply and specifically. However, the figures are only for references and descriptions, but the present disclosure is not limited by the figures.

DETAILED DESCRIPTION

Figure 1:
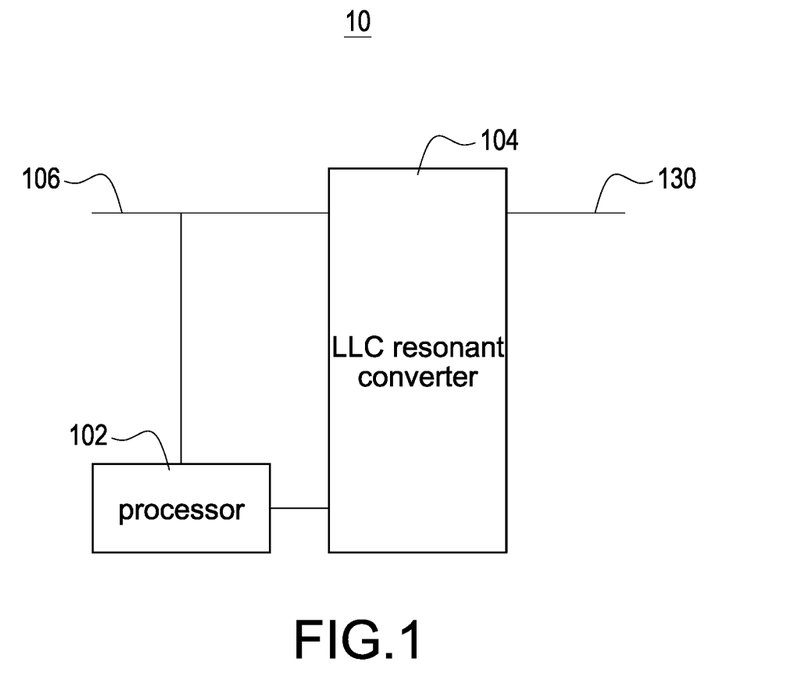
FIG. 1 shows a block diagram of the first embodiment of the LLC resonant converting apparatus of the present disclosure.

In the present disclosure, numerous specific details are provided, to provide a thorough understanding of embodiments of the disclosure. Persons of ordinary skill in the art will recognize, however, that the present disclosure can be practiced without one or more of the specific details. In other instances, well-known details are not shown or described to avoid obscuring aspects of the present disclosure. Now please refer to the figures for the explanation of the technical content and the detailed description of the present disclosure:

FIG. 1 shows a block diagram of the first embodiment of the LLC resonant converting apparatus of the present disclosure. As shown in FIG. 1, an LLC resonant converting apparatus 10 of the present disclosure includes a processor 102 and an LLC resonant converter 104 electrically connected to the processor 102, wherein the LLC resonant converter 104 is configured to receive an input voltage 106 (for example, a DC voltage).

Figure 2:
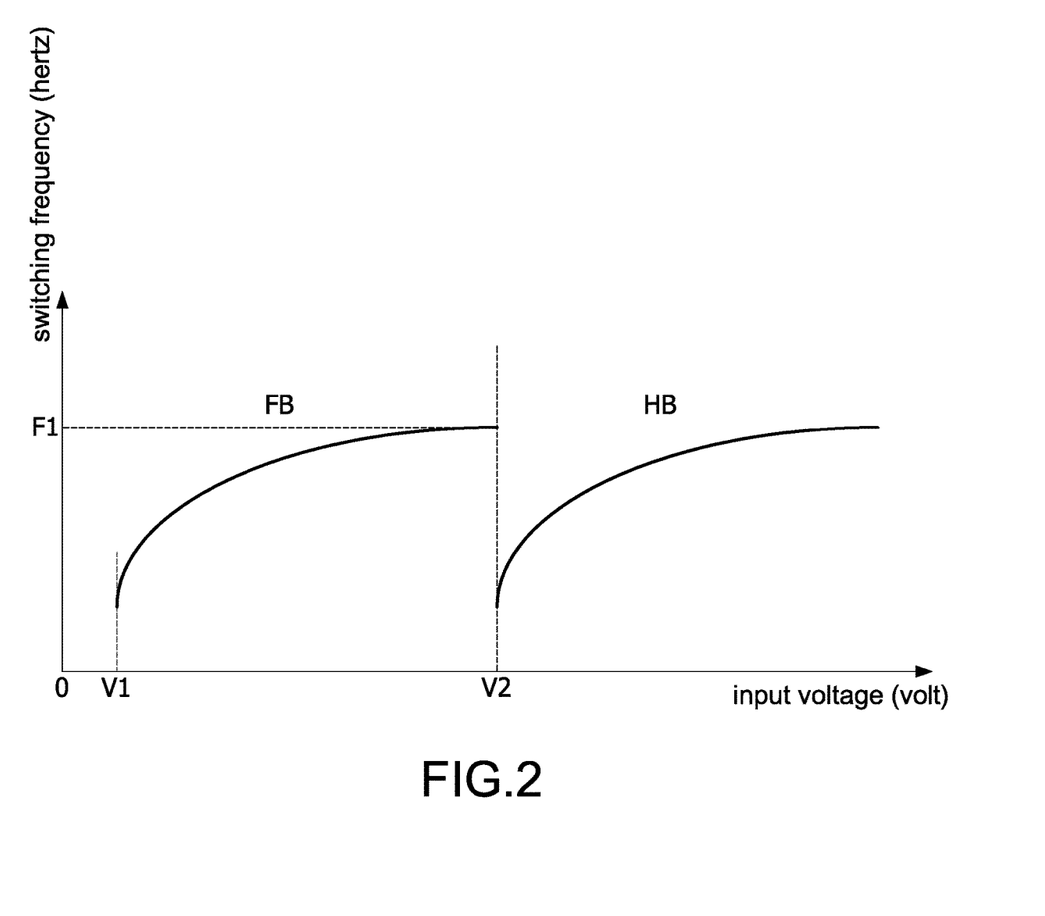
FIG. 2 shows a comparison diagram of the input voltage versus the switching frequency of the LLC resonant converting apparatus of the present disclosure.

FIG. 2 shows a comparison diagram of the input voltage versus the switching frequency of the LLC resonant converting apparatus of the present disclosure; please refer to FIG. 1 and FIG. 2 at the same time. When the input voltage 106 is greater than a predetermined voltage V2, the processor 102 is configured to control the LLC resonant converter 104 to operate in a half-bridge operating mode HB, so that the LLC resonant converter 104 is configured to operate as a half-bridge LLC resonant converter; when the input voltage 106 is less than or equal to the predetermined voltage V2, the processor 102 is configured to control the LLC resonant converter 104 to operate in a full-bridge operating mode FB, so that the LLC resonant converter 104 is configured to operate as a full-bridge LLC resonant converter. Moreover, based on the design requirement, the predetermined voltage V2 is, for example but not limited to, between 300 volts and 320 volts, for example, 300 volts, 310 volts, or 320 volts.

Figure 3:
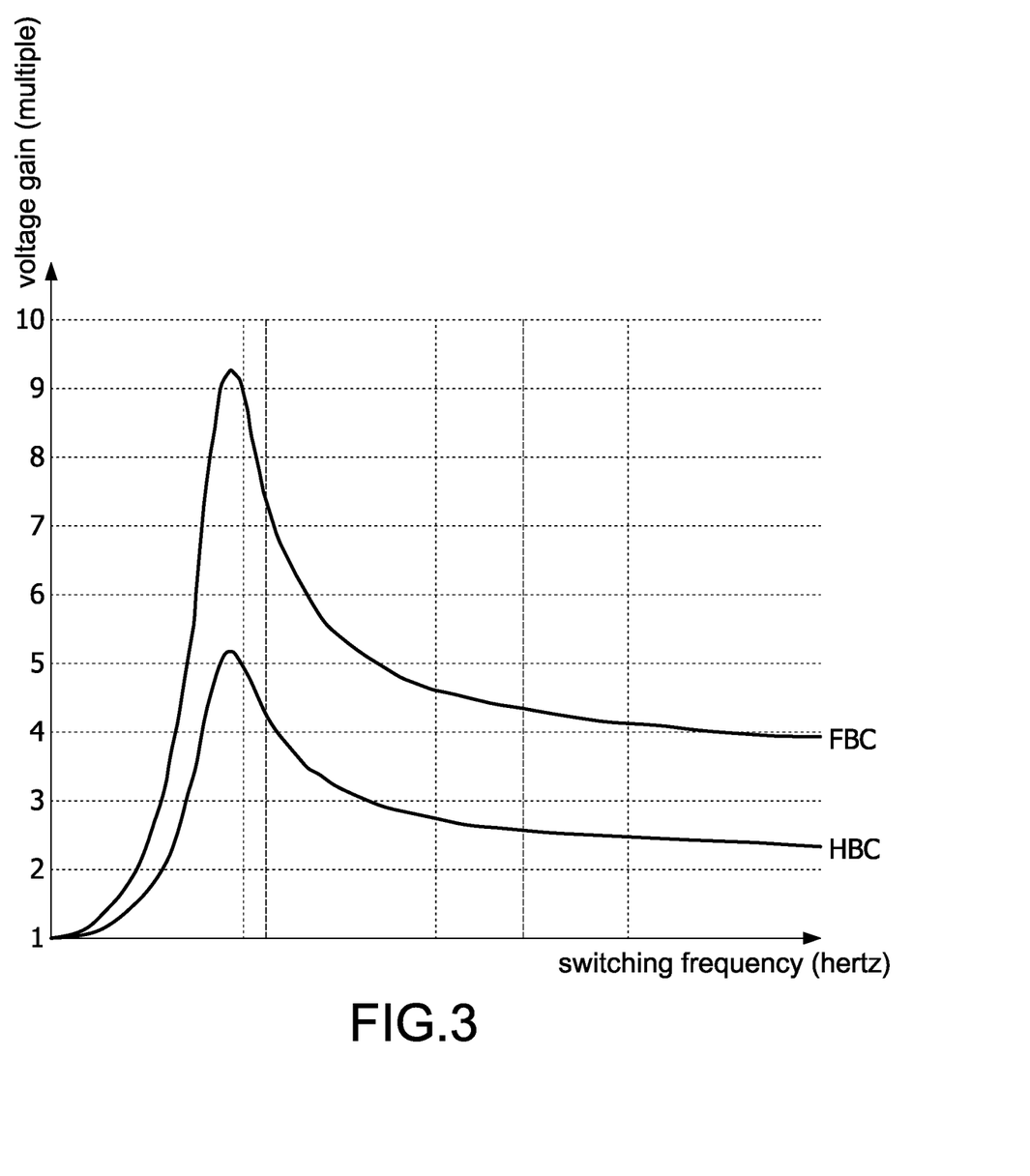
FIG. 3 shows a comparison diagram of the switching frequency versus the voltage gain when the half-bridge operating mode and the full-bridge operating mode of the present disclosure are based on the same output voltage.

FIG. 3 shows a comparison diagram of the switching frequency versus the voltage gain when the half-bridge operating mode and the full-bridge operating mode of the present disclosure are based on the same output voltage; please refer to FIG. 1 to FIG. 3 at the same time. A half-bridge curve HBC represents a curve of the switching frequency versus the voltage gain of the LLC resonant converter 104 operating in the half-bridge operating mode HB while a full-bridge curve FBC represents a curve of the switching frequency versus the voltage gain of the LLC resonant converter 104 operating in the full-bridge operating mode FB.

It can be seen from FIG. 3 that at the same switching frequency, the voltage gain in the full-bridge operating mode FB (the full-bridge curve FBC) will be approximately equal to twice the voltage gain in the half-bridge operating mode HB (the half-bridge curve HBC); in other words, based on the same output voltage and the same switching frequency, the input voltage 106 required by the LLC resonant converter 104 operating in the full-bridge operating mode FB is only half of the input voltage 106 required by the LLC resonant converter 104 operating in the half-bridge operating mode HB.

Please refer to FIG. 1 and FIG. 2 again. When the input voltage 106 is greater than the predetermined voltage V2, since the input voltage 106 is higher, the required voltage gain is lower, and the LLC resonant converter 104 can operate in the half-bridge operating mode HB; when the input voltage 106 is less than or equal to the predetermined voltage V2, since the input voltage 106 is lower, the required voltage gain is higher, and the LLC resonant converter 104 has to operate in the full-bridge operating mode FB to maintain the stable output voltage.

Regardless of whether the LLC resonant converter 104 operates in the half-bridge operating mode HB or the full-bridge operating mode FB, as the input voltage 106 gradually decreases, the switching frequency will gradually decrease. For the LLC resonant converter 104 operating in the full-bridge operating mode FB, when the input voltage 106 is less than a designed voltage V1, the LLC resonant converter 104 operating in the full-bridge operating mode FB will stop operating.

Moreover, the LLC resonant converter 104 includes a plurality of metal oxide semiconductor field effect transistors (for example, the S1~S4 shown in FIG. 5 to FIG. 8) electrically connected to the processor 102. As shown in FIG. 1 and FIG. 2, at a moment that the LLC resonant converter 104 is configured to switch from the half-bridge operating mode HB to the full-bridge operating mode FB (namely, at the V2 shown in FIG. 2), the LLC resonant converter 104 is configured to increase a switching frequency to a maximum switching frequency F1 for the metal oxide semiconductor field effect transistors, so that the LLC resonant converter 104 is configured to maintain an output voltage 130.

Figure 4:
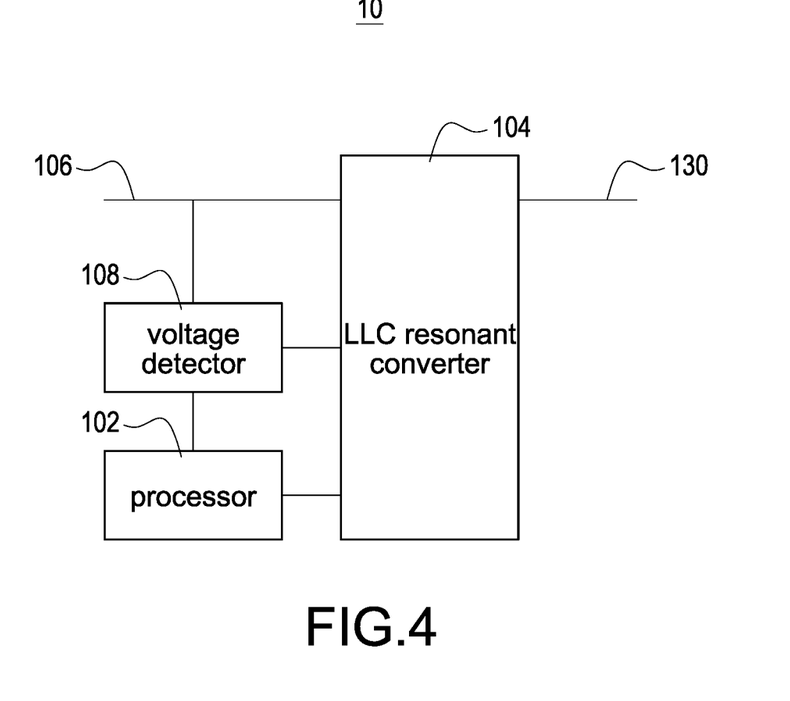
FIG. 4 shows a block diagram of the second embodiment of the LLC resonant converting apparatus of the present disclosure.

FIG. 4 shows a block diagram of the second embodiment of the LLC resonant converting apparatus of the present disclosure, wherein the descriptions of the elements shown in FIG. 4 which are the same as the elements shown in FIG. 1 to FIG. 3 are not repeated here for brevity. As shown in FIG. 4, the LLC resonant converting apparatus 10 further includes a voltage detector 108 electrically connected to the processor 102 and the LLC resonant converter 104.

In the embodiment of FIG. 4, the voltage detector 108 is configured to detect the input voltage 106 to inform the processor 102 of the input voltage 106, so that the processor 102 is configured to learn a magnitude of the input voltage 106 to determine whether the LLC resonant converter 104 is configured to operate in the half-bridge operating mode HB or the full-bridge operating mode FB; however, the present disclosure is not limited by FIG. 4; for example, in the embodiment of FIG. 1, the processor 102 is configured to have a voltage detection function to learn the magnitude of the input voltage 106 to determine whether the LLC resonant converter 104 is configured to operate in the half-bridge operating mode HB or the full-bridge operating mode FB.

Figure 5:
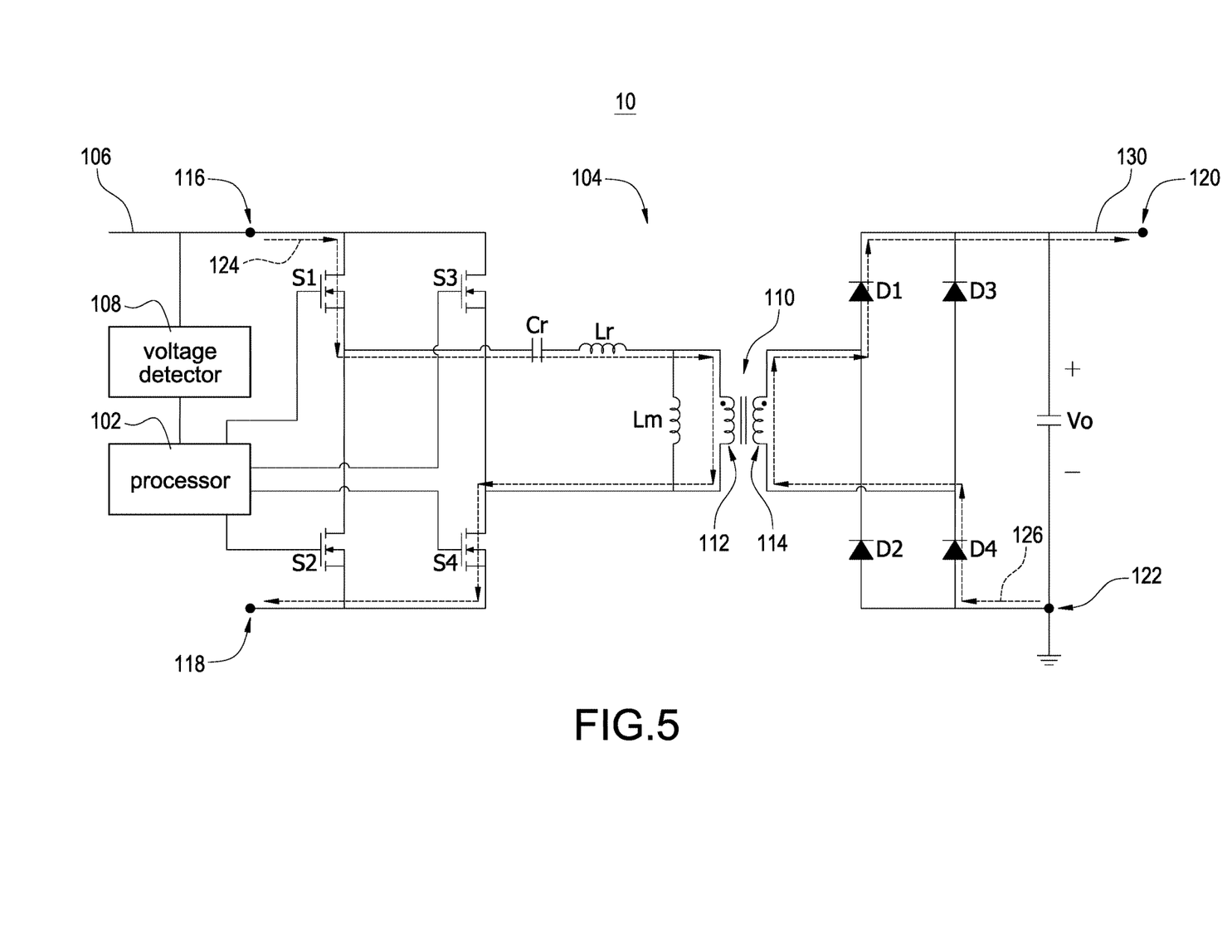
FIG. 5 shows a block diagram of the LLC resonant converting apparatus operating in the half-bridge first state of the present disclosure.
Figure 6:
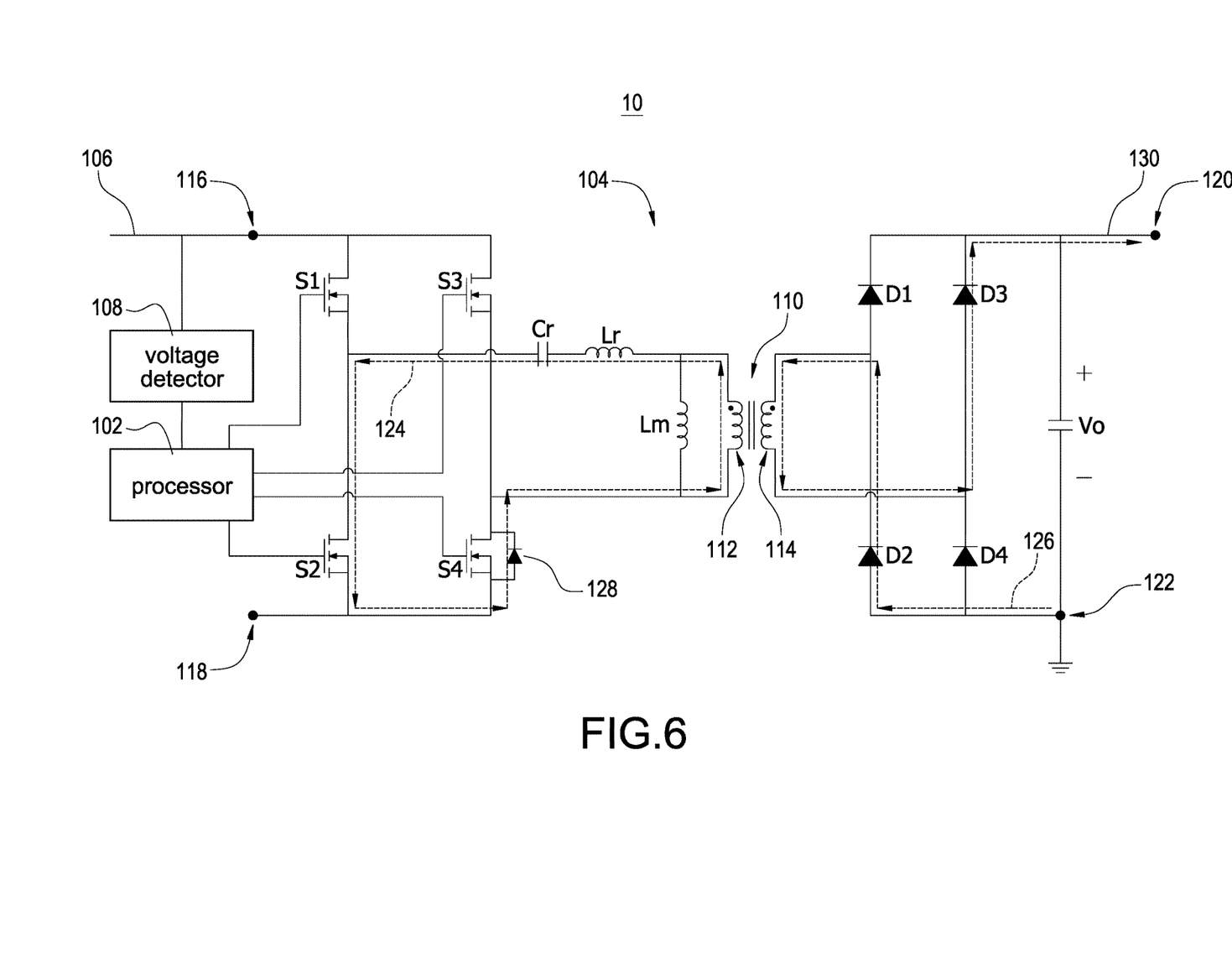
FIG. 6 shows a block diagram of the LLC resonant converting apparatus operating in the half-bridge second state of the present disclosure.
Figure 7:
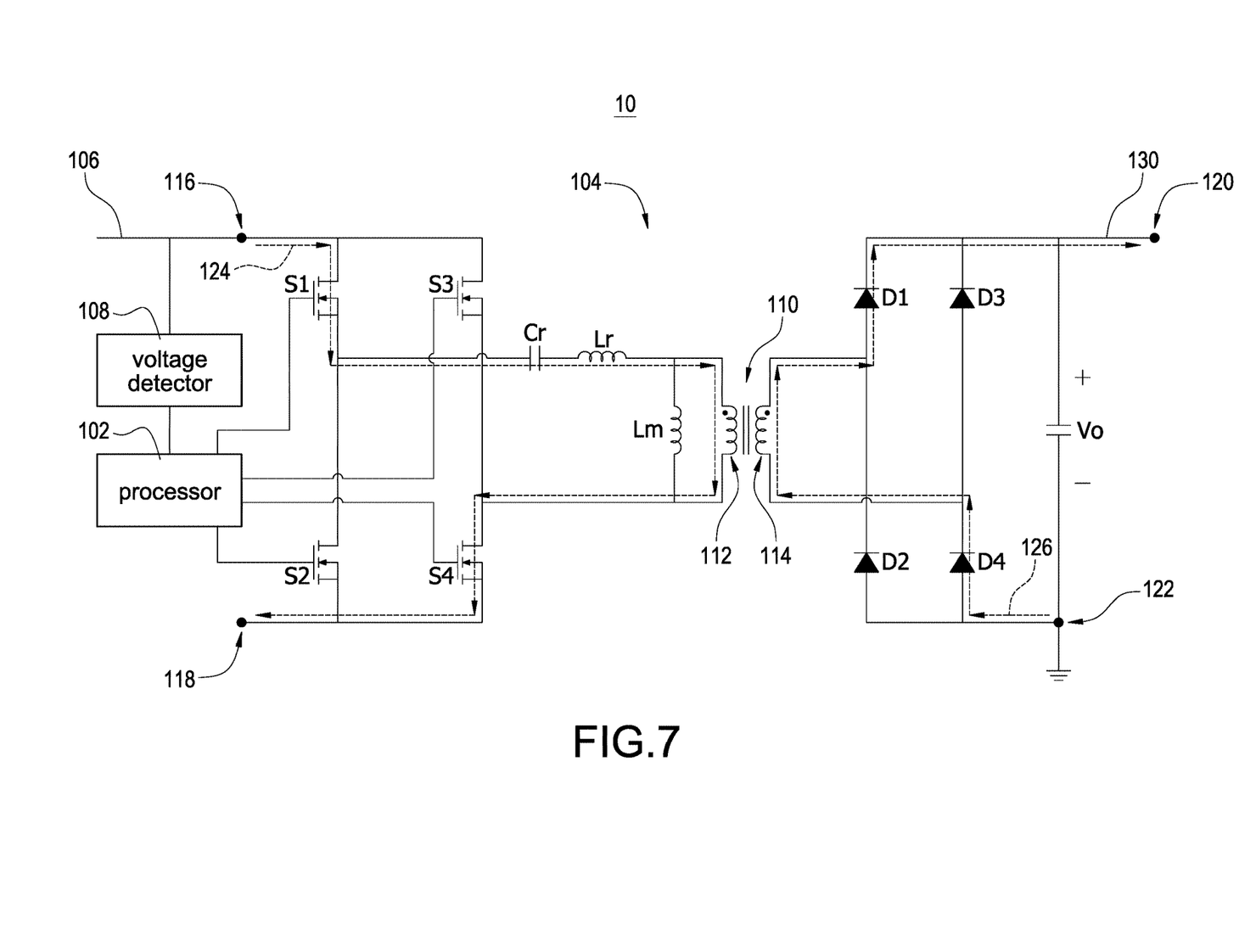
FIG. 7 shows a block diagram of the LLC resonant converting apparatus operating in the full-bridge first state of the present disclosure.
Figure 8:
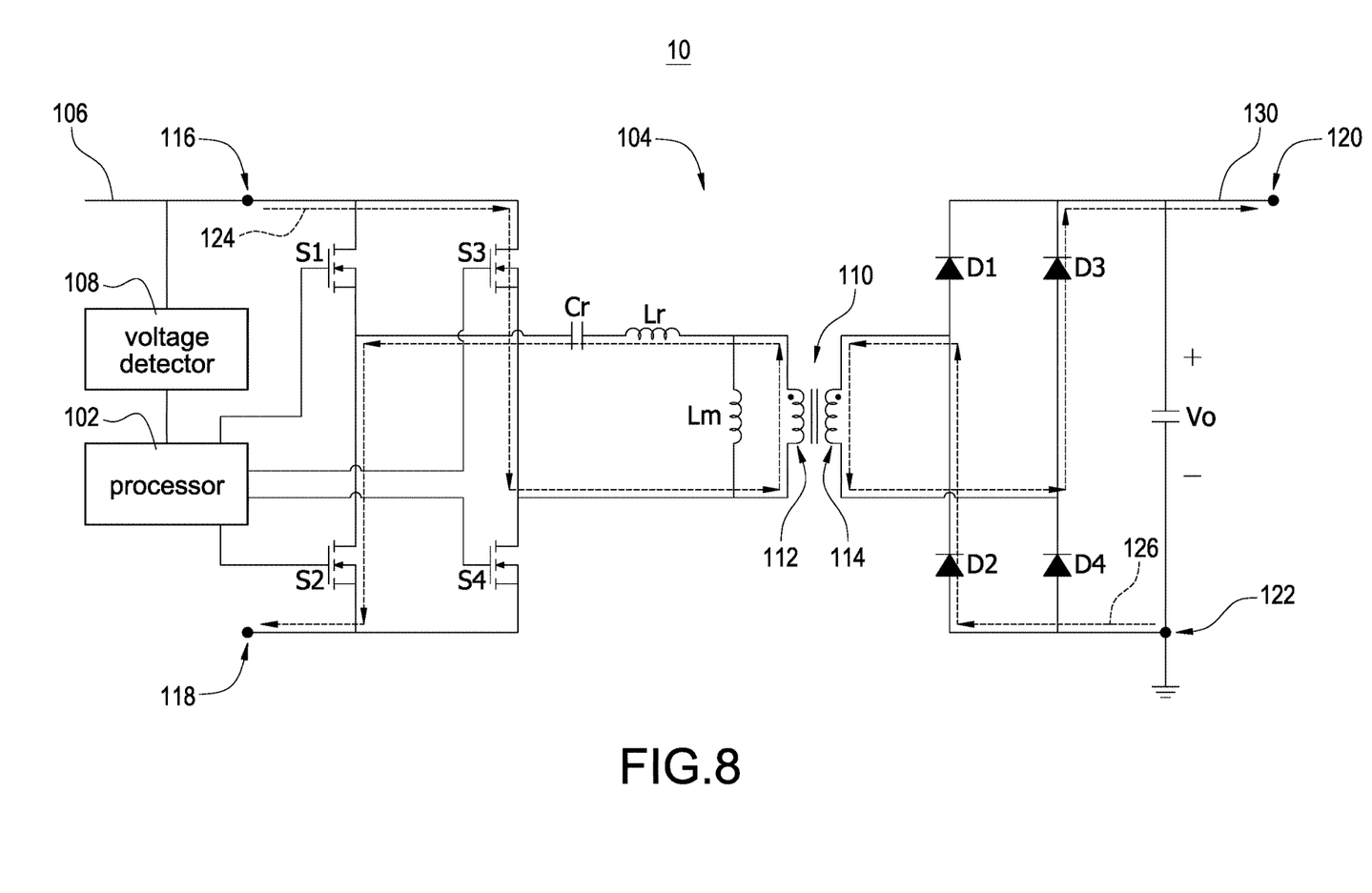
FIG. 8 shows a block diagram of the LLC resonant converting apparatus operating in the full-bridge second state of the present disclosure.

FIG. 5 shows a block diagram of the LLC resonant converting apparatus operating in the half-bridge first state of the present disclosure; FIG. 6 shows a block diagram of the LLC resonant converting apparatus operating in the half-bridge second state of the present disclosure; FIG. 7 shows a block diagram of the LLC resonant converting apparatus operating in the full-bridge first state of the present disclosure; FIG. 8 shows a block diagram of the LLC resonant converting apparatus operating in the full-bridge second state of the present disclosure; the descriptions of the elements shown in FIG. 5 to FIG. 8 which are the same as the elements shown in FIG. 1 to FIG. 4 are not repeated here for brevity, wherein the dashed arrows in FIG. 5 to FIG. 8 are the directions of the currents which are described in details later.

The LLC resonant converter 104 includes a first metal oxide semiconductor field effect transistor S1, a second metal oxide semiconductor field effect transistor S2, a third metal oxide semiconductor field effect transistor S3, a fourth metal oxide semiconductor field effect transistor S4, a resonant capacitor Cr, a resonant inductor Lr, a magnetizing inductor Lm, a transformer 110, a first diode D1, a second diode D2, a third diode D3, a fourth diode D4, an output-end capacitor Vo, a primary-side first point 116, a primary-side second point 118, a secondary-side first point 120 and a secondary-side second point 122; the transformer 110 includes a primary-side winding 112 and a secondary-side winding 114.

As shown in FIG. 1 and FIG. 2, when the input voltage 106 is greater than the predetermined voltage V2, the LLC resonant converter 104 operates in the half-bridge operating mode HB; when the input voltage 106 is less than or equal to the predetermined voltage V2, the LLC resonant converter 104 operates in the full-bridge operating mode FB. Please refer to FIG. 5 to FIG. 8 together; the half-bridge operating mode HB can be divided into a half-bridge first state (FIG. 5) and a half-bridge second state (FIG. 6) while the full-bridge operating mode FB can be divided into a full-bridge first state (FIG. 7) and a full-bridge second state (FIG. 8); the details are described as follows:

When the LLC resonant converter 104 is configured to operate in the half-bridge operating mode HB, the LLC resonant converter 104 is configured to alternately operate in the half-bridge first state (FIG. 5) and the half-bridge second state (FIG. 6).

Please refer to FIG. 5; when the LLC resonant converter 104 is configured to operate in the half-bridge first state, the processor 102 is configured to turn on the first metal oxide semiconductor field effect transistor S1 and the fourth metal oxide semiconductor field effect transistor S4, and turn off the second metal oxide semiconductor field effect transistor S2 and the third metal oxide semiconductor field effect transistor S3, so that a primary-side current 124 flows through the primary-side first point 116, the first metal oxide semiconductor field effect transistor S1, the resonant capacitor Cr, the resonant inductor Lr, the primary-side winding 112, the fourth metal oxide semiconductor field effect transistor S4 and the primary-side second point 118, and a secondary-side current 126 flows through the secondary-side second point 122, the fourth diode D4, the secondary-side winding 114, the first diode D1 and the secondary-side first point 120.

Please refer to FIG. 6; when the LLC resonant converter 104 is configured to operate in the half-bridge second state, the processor 102 is configured to turn off the first metal oxide semiconductor field effect transistor S1, the third metal oxide semiconductor field effect transistor S3 and the fourth metal oxide semiconductor field effect transistor S4, and turn on the second metal oxide semiconductor field effect transistor S2, so that the primary-side current 124 flows between the resonant inductor Lr, the resonant capacitor Cr, the second metal oxide semiconductor field effect transistor S2, a parasitic diode 128 of the fourth metal oxide semiconductor field effect transistor S4 and the primary-side winding 112, and the secondary-side current 126 flows through the secondary-side second point 122, the second diode D2, the secondary-side winding 114, the third diode D3 and the secondary-side first point 120.

It should be understood that the metal oxide semiconductor field effect transistor must have a parasitic diode (also called a back-connected diode), and in order to explain the current directions more clearly, only the fourth metal oxide semiconductor field effect transistor S4 in FIG. 6 shows the parasitic diode 128.

When the LLC resonant converter 104 is configured to operate in the full-bridge operating mode FB, the LLC resonant converter 104 is configured to alternately operate in the full-bridge first state (FIG. 7) and the full-bridge second state (FIG. 8).

Please refer to FIG. 7; when the LLC resonant converter 104 is configured to operate in the full-bridge first state, the processor 102 is configured to turn on the first metal oxide semiconductor field effect transistor S1 and the fourth metal oxide semiconductor field effect transistor S4, and turn off the second metal oxide semiconductor field effect transistor S2 and the third metal oxide semiconductor field effect transistor S3, so that the primary-side current 124 flows through the primary-side first point 116, the first metal oxide semiconductor field effect transistor S1, the resonant capacitor Cr, the resonant inductor Lr, the primary-side winding 112, the fourth metal oxide semiconductor field effect transistor S4 and the primary-side second point 118, and the secondary-side current 126 flows through the secondary-side second point 122, the fourth diode D4, the secondary-side winding 114, the first diode D1 and the secondary-side first point 120.

Please refer to FIG. 8; when the LLC resonant converter 104 is configured to operate in the full-bridge second state, the processor 102 is configured to turn off the first metal oxide semiconductor field effect transistor S1 and the fourth metal oxide semiconductor field effect transistor S4, and turn on the second metal oxide semiconductor field effect transistor S2 and the third metal oxide semiconductor field effect transistor S3, so that the primary-side current 124 flows through the primary-side first point 116, the third metal oxide semiconductor field effect transistor S3, the primary-side winding 112, the resonant inductor Lr, the resonant capacitor Cr, the second metal oxide semiconductor field effect transistor S2 and the primary-side second point 118, and the secondary-side current 126 flows through the secondary-side second point 122, the second diode D2, the secondary-side winding 114, the third diode D3 and the secondary-side first point 120.

Figure 9:
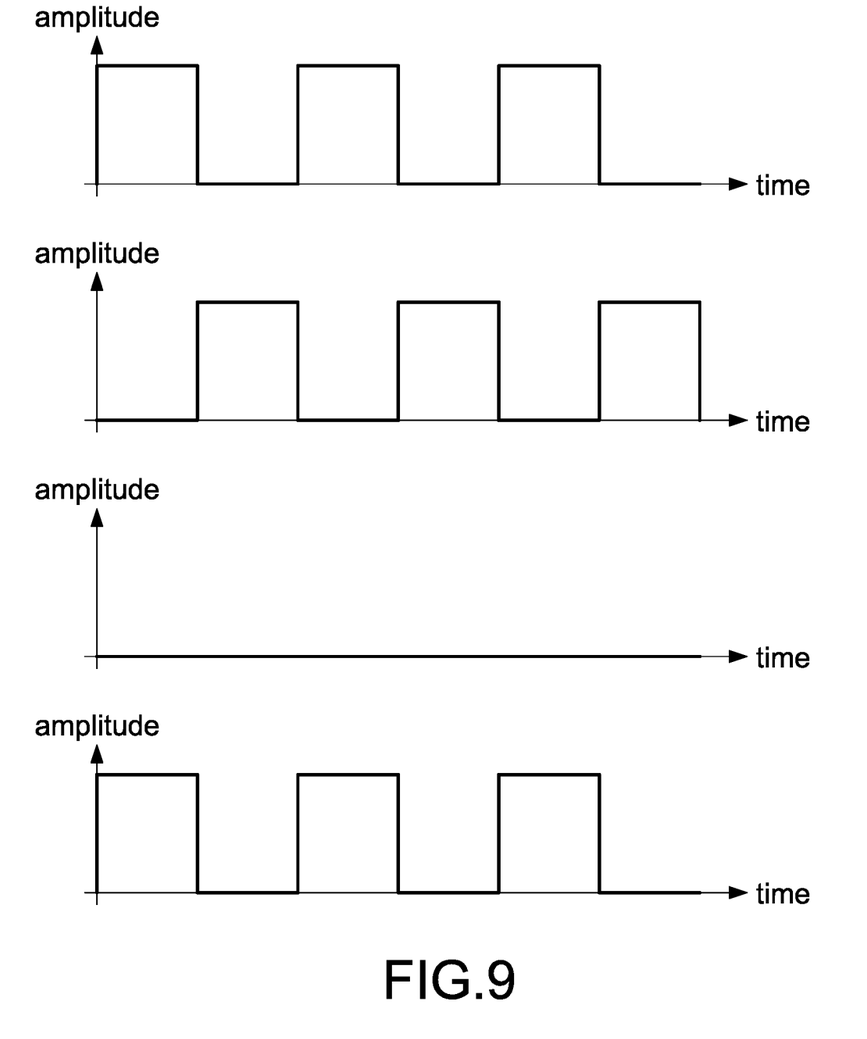
FIG. 9 shows waveform timing diagrams of the control signals transmitted from the processor to the metal oxide semiconductor field effect transistors in the half-bridge operating mode of the present disclosure.
Figure 10:
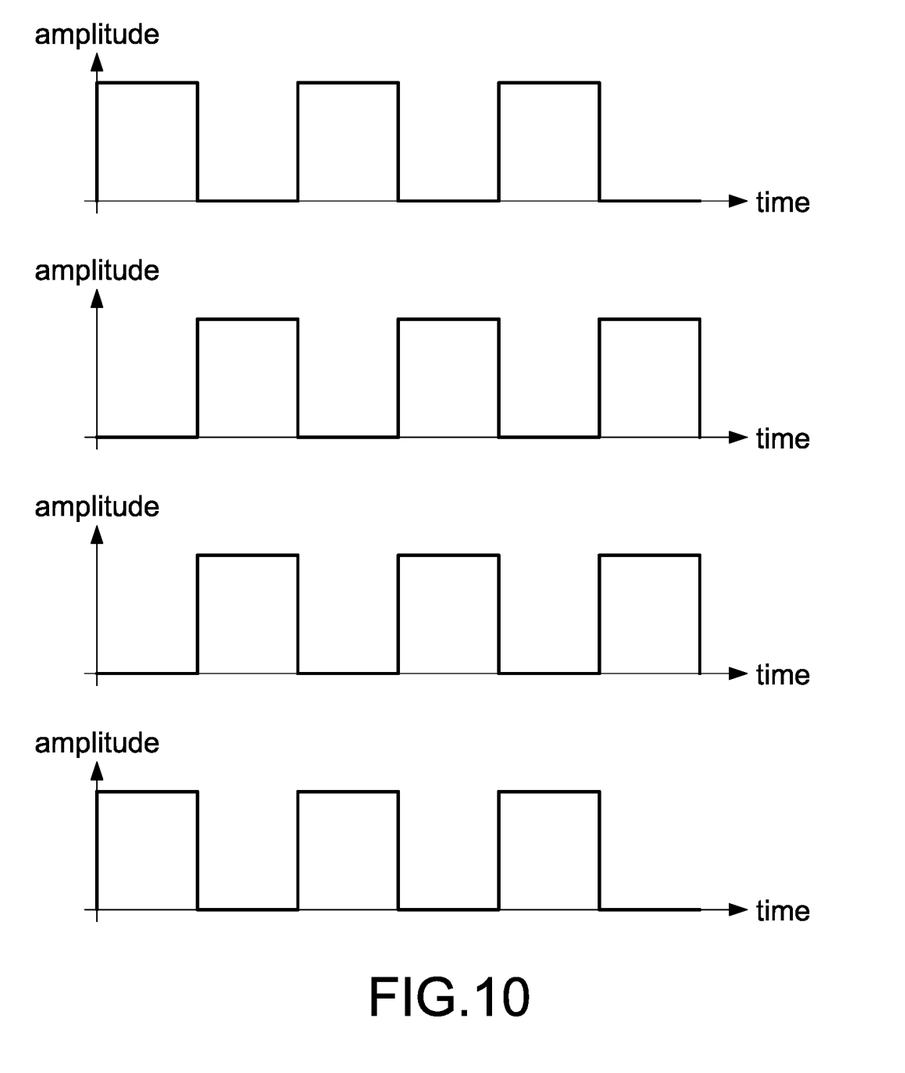
FIG. 10 shows waveform timing diagrams of the control signals transmitted from the processor to the metal oxide semiconductor field effect transistors in the full-bridge operating mode of the present disclosure.

FIG. 9 shows waveform timing diagrams of the control signals transmitted from the processor to the metal oxide semiconductor field effect transistors in the half-bridge operating mode of the present disclosure while FIG. 10 shows waveform timing diagrams of the control signals transmitted from the processor to the metal oxide semiconductor field effect transistors in the full-bridge operating mode of the present disclosure. In FIG. 9 and FIG. 10, the first waveform, the second waveform, the third waveform and the fourth waveform from top to bottom respectively represent the waveforms of the control signals (for example, the pulse width modulation signals) transmitted from the processor 102 to the first metal oxide semiconductor field effect transistor S1, the second metal oxide semiconductor field effect transistor S2, the third metal oxide semiconductor field effect transistor S3 and the fourth metal oxide semiconductor field effect transistor S4. The present disclosure utilizes the waveform timings of FIG. 9 to control the LLC resonant converter 104 to alternately operate in the half-bridge first state (FIG. 5) and the half-bridge second state (FIG. 6) while the present disclosure utilizes the waveform timings of FIG. 10 to control the LLC resonant converter 104 to alternately operate in the full-bridge first state (FIG. 7) and the full-bridge second state (FIG. 8).

The front end of the LLC resonant converter 104 of the present disclosure can be connected to an AC-to-DC converter (not shown in the figures) with a power factor correction function, and the front end of the AC-to-DC converter can be connected to an AC power grid (not shown in the figures) which provides 100 volts to 240 volts, wherein the feature of the AC-to-DC converter is that when the difference between the input voltage and the output voltage is small, a higher conversion efficiency can be obtained. On the other hand, extending the operable range of the input voltage of the LLC resonant converter 104 to a lower voltage also helps to obtain more input capacitor power to extend the holding time.

Please refer to FIG. 2 again; because the present disclosure can cover the input voltage ranges of the half-bridge operating mode HB and the full-bridge operating mode FB, the present disclosure can enable the LLC resonant converter 104 to have a wide input voltage range, so that the holding time (hold-up time) can be extended to greatly reduce the volume and the cost of the output-end capacitor; the present disclosure can enable the LLC resonant converter 104 to have a wider gain, so that the DC input voltage operating point can be extended to a lower level to obtain a longer holding time and better conversion efficiency.

Although the present disclosure has been described with reference to the preferred embodiment thereof, it will be understood that the disclosure is not limited to the details thereof. Various substitutions and modifications have been suggested in the foregoing description, and others will occur to those of ordinary skill in the art. Therefore, all such substitutions and modifications are intended to be embraced within the scope of the disclosure as defined in the appended claims.

What is claimed is:

1. An LLC resonant converting apparatus comprising:
a processor; and
an LLC resonant converter electrically connected to the processor,
wherein the LLC resonant converter is configured to receive an input voltage; when the input voltage is greater than a predetermined voltage, the processor is configured to control the LLC resonant converter to operate in a half-bridge operating mode, so that the LLC resonant converter is configured to operate as a half-bridge LLC resonant converter; when the input voltage is less than or equal to the predetermined voltage, the processor is configured to control the LLC resonant converter to operate in a full-bridge operating mode, so that the LLC resonant converter is configured to operate as a full-bridge LLC resonant converter;
wherein the LLC resonant converter comprises:
a first metal oxide semiconductor field effect transistor electrically connected to the processor;
a second metal oxide semiconductor field effect transistor electrically connected to the processor and the first metal oxide semiconductor field effect transistor;
a third metal oxide semiconductor field effect transistor electrically connected to the processor and the first metal oxide semiconductor field effect transistor; and
a fourth metal oxide semiconductor field effect transistor electrically connected to the processor and the third metal oxide semiconductor field effect transistor,
wherein when the LLC resonant converter is configured to operate in the half-bridge operating mode, the LLC resonant converter is configured to alternately operate in a half-bridge first state and a half-bridge second state; when the LLC resonant converter is configured to operate in the half-bridge second state, the processor is configured to turn off the first metal oxide semiconductor field effect transistor, the third metal oxide semiconductor field effect transistor and the fourth metal oxide semiconductor field effect transistor, and turn on the second metal oxide semiconductor field effect transistor.

2. The LLC resonant converting apparatus of claim 1, further comprising:
a voltage detector electrically connected to the processor and the LLC resonant converter,
wherein the voltage detector is configured to detect the input voltage to inform the processor of the input voltage, so that the processor is configured to learn a magnitude of the input voltage to determine whether the LLC resonant converter is configured to operate in the half-bridge operating mode or the full-bridge operating mode.

3. The LLC resonant converting apparatus of claim 2, wherein when the LLC resonant converter is configured to operate in the half-bridge first state, the processor is configured to turn on the first metal oxide semiconductor field effect transistor and the fourth metal oxide semiconductor field effect transistor, and turn off the second metal oxide semiconductor field effect transistor and the third metal oxide semiconductor field effect transistor.

4. The LLC resonant converting apparatus of claim 3, wherein when the LLC resonant converter is configured to operate in the full-bridge operating mode, the LLC resonant converter is configured to alternately operate in a full-bridge first state and a full-bridge second state; when the LLC resonant converter is configured to operate in the full-bridge first state, the processor is configured to turn on the first metal oxide semiconductor field effect transistor and the fourth metal oxide semiconductor field effect transistor, and turn off the second metal oxide semiconductor field effect transistor and the third metal oxide semiconductor field effect transistor; when the LLC resonant converter is configured to operate in the full-bridge second state, the processor is configured to turn off the first metal oxide semiconductor field effect transistor and the fourth metal oxide semiconductor field effect transistor, and turn on the second metal oxide semiconductor field effect transistor and the third metal oxide semiconductor field effect transistor.

5. The LLC resonant converting apparatus of claim 4, wherein the LLC resonant converter further comprises:
a resonant capacitor electrically connected to the first metal oxide semiconductor field effect transistor and the second metal oxide semiconductor field effect transistor;
a resonant inductor electrically connected to the resonant capacitor; and
a magnetizing inductor electrically connected to the resonant inductor, the third metal oxide semiconductor field effect transistor and the fourth metal oxide semiconductor field effect transistor.

6. The LLC resonant converting apparatus of claim 5, wherein the LLC resonant converter further comprises:
a transformer electrically connected to the resonant inductor, the third metal oxide semiconductor field effect transistor, the fourth metal oxide semiconductor field effect transistor and the magnetizing inductor;
a first diode electrically connected to the transformer;
a second diode electrically connected to the transformer and the first diode;
a third diode electrically connected to the transformer and the first diode;
a fourth diode electrically connected to the transformer and the third diode; and
an output-end capacitor electrically connected to the first diode and the third diode.

7. The LLC resonant converting apparatus of claim 6, wherein the LLC resonant converter further comprises:
a primary-side first point electrically connected to the voltage detector, the first metal oxide semiconductor field effect transistor and the third metal oxide semiconductor field effect transistor;
a primary-side second point electrically connected to the second metal oxide semiconductor field effect transistor and the fourth metal oxide semiconductor field effect transistor;
a secondary-side first point electrically connected to the first diode, the third diode and the output-end capacitor; and
a secondary-side second point electrically connected to the second diode, the fourth diode and the output-end capacitor,
wherein the transformer comprises:
a primary-side winding electrically connected to the resonant inductor, the third metal oxide semiconductor field effect transistor, the fourth metal oxide semiconductor field effect transistor and the magnetizing inductor; and
a secondary-side winding electrically connected to the first diode, the third diode and the fourth diode.

8. The LLC resonant converting apparatus of claim 7, wherein when the LLC resonant converter is configured to operate in the half-bridge first state, a primary-side current flows through the primary-side first point, the first metal oxide semiconductor field effect transistor, the resonant capacitor, the resonant inductor, the primary-side winding, the fourth metal oxide semiconductor field effect transistor and the primary-side second point, and a secondary-side current flows through the secondary-side second point, the fourth diode, the secondary-side winding, the first diode and the secondary-side first point;

wherein when the LLC resonant converter is configured to operate in the half-bridge second state, the primary-side current flows between the resonant inductor, the resonant capacitor, the second metal oxide semiconductor field effect transistor, a parasitic diode of the fourth metal oxide semiconductor field effect transistor and the primary-side winding, and the secondary-side current flows through the secondary-side second point, the second diode, the secondary-side winding, the third diode and the secondary-side first point.

9. The LLC resonant converting apparatus of claim 8, wherein the LLC resonant converter is configured to operate in the full-bridge first state, the primary-side current flows through the primary-side first point, the first metal oxide semiconductor field effect transistor, the resonant capacitor, the resonant inductor, the primary-side winding, the fourth metal oxide semiconductor field effect transistor and the primary-side second point, and the secondary-side current flows through the secondary-side second point, the fourth diode, the secondary-side winding, the first diode and the secondary-side first point;

wherein when the LLC resonant converter is configured to operate in the full-bridge second state, the primary-side current flows through the primary-side first point, the third metal oxide semiconductor field effect transistor, the primary-side winding, the resonant inductor, the resonant capacitor, the second metal oxide semiconductor field effect transistor and the primary-side second point, and the secondary-side current flows through the secondary-side second point, the second diode, the secondary-side winding, the third diode and the secondary-side first point.

\* \* \* \* \*